United States Patent
Ruter

[11] 3,856,243
[45] Dec. 24, 1974

[54] HOLDER

[76] Inventor: Lewis L. Ruter, 2111 3rd St., North, Minneapolis, Minn. 55411

[22] Filed: Feb. 8, 1972

[21] Appl. No.: 224,508

Related U.S. Application Data

[62] Division of Ser. No. 15,368, March 2, 1970, Pat. No. 3,640,494.

[52] U.S. Cl............................... 248/42, 248/314
[51] Int. Cl............................................ A01k 97/10
[58] Field of Search............ 248/38, 39, 40, 41, 42, 248/82, 84, 86, 88, 156

[56] References Cited
UNITED STATES PATENTS

| 462,265 | 11/1891 | Mason | 248/40 |
|---|---|---|---|
| 923,596 | 6/1909 | Staples | 248/40 |
| 1,873,615 | 8/1932 | McIntosh | 248/88 |
| 2,416,828 | 4/1947 | Hamre | 248/42 |
| 2,520,818 | 8/1950 | Terry | 248/156 X |
| 2,961,209 | 11/1960 | Willey | 248/41 |
| 2,981,509 | 4/1961 | Messenger et al | 248/42 |
| 3,306,371 | 2/1967 | Bush | 172/540 |
| 3,306,560 | 2/1967 | Wheeler | 248/42 |
| 3,564,753 | 2/1971 | Fravel | 248/42 X |
| 3,595,504 | 7/1971 | Anderson | 248/42 |
| 3,640,494 | 2/1972 | Ruter | 248/42 |

Primary Examiner—William H. Schultz

[57] ABSTRACT

An elongated arm attached to a mount having a generally upright end portion positionable in the hole of an oarlock on a fishing boat for holding a floating fish basket in the water adjacent the boat. A connector attaches the arm to the mount, permitting angular movement of the arm. A stop member, secured to a portion of the arm adjacent the upright end, cooperates with the side of the boat to limit the pivotal movement of the arm relative to the boat and thereby maintain the arm in a generally lateral position with respect to the side of the boat. The outer end of the arm has a ring carrying a flexible chain attachable to the floating fish basket. Secured to spaced portions of the arm are a downwardly open loop and an upwardly open hook for accommodating a fishing rod. Located opposite the loop is an upwardly open spiral portion for accommodating a container, as a can, a box of worms or a beverage container.

16 Claims, 11 Drawing Figures

PATENTED DEC 24 1974　　　　　　　　3,856,243

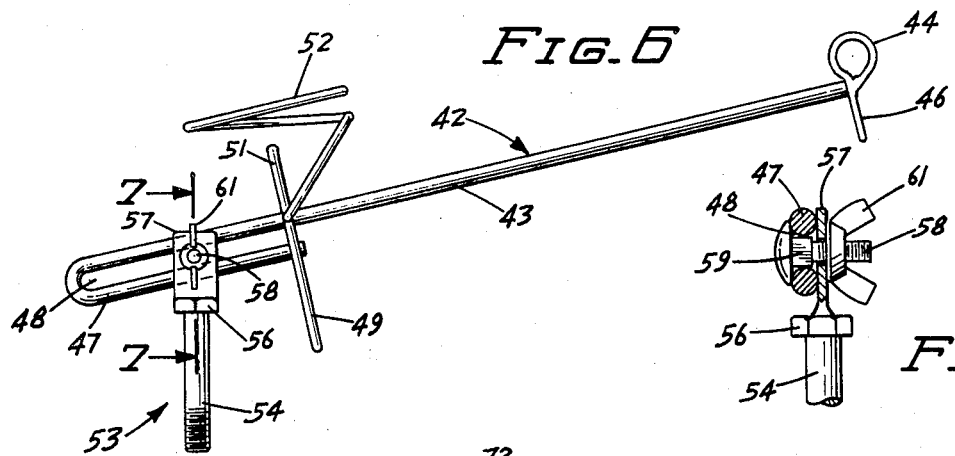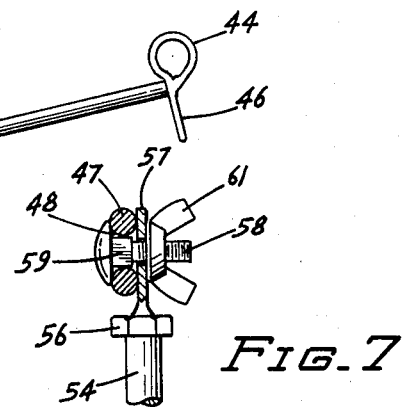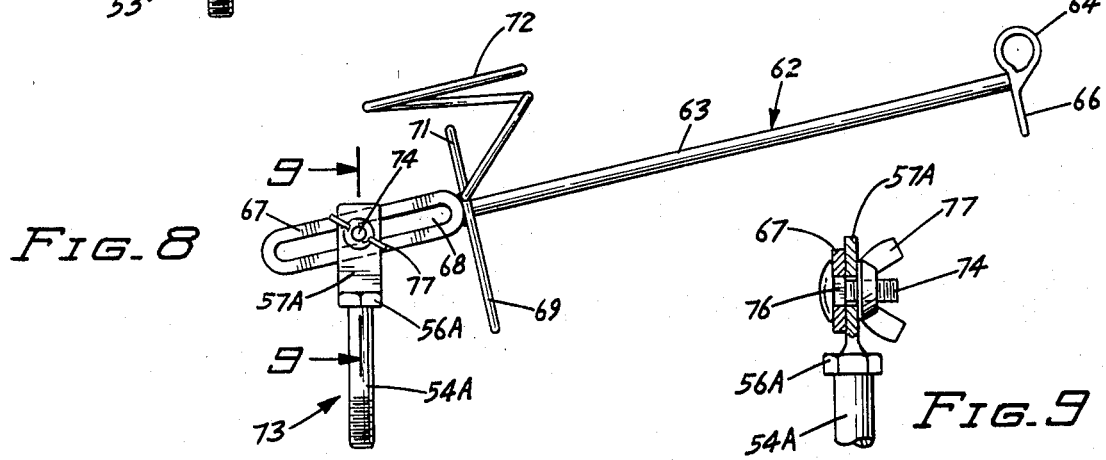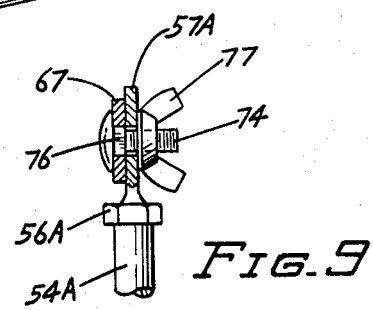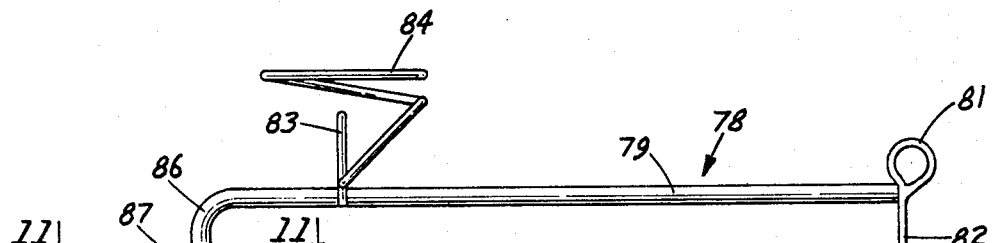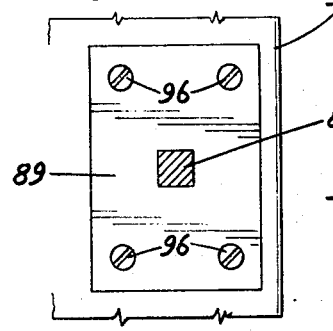

HOLDER

CROSS-REFERENCE TO RELATED APPLICATION

This application is a division of U.S. application Ser. No. 15,368 filed Mar. 2, 1970, now U.S. Pat. No. 3,640,494.

BACKGROUND OF INVENTION

Boat clamps have been used to attach fish stringers and wire fish baskets to fishing boats. The boat clamp is a generally U-shaped member carrying a threaded bolt adapted to clamp onto the side of the boat. An arm attached to the U-shaped member carries the wire fish basket. In some clamps, a chain is attached to the arm to connect the fish basket or fish stringer to the arm. These clamps are not adapted to fit all types of boats, as the top edge or bead around the boats vary in thickness so as to preclude the use of these clamps. When clamps are used, they damage the paint, coating or finish of both the inside and outside of the boat. These clamps cannot be used with the oarlock of a boat and do not have structures for holding a container or a fish rod.

SUMMARY OF INVENTION

The invention relates to a holder mountable on a support having a generally upright hole for attaching an object to the support. The holder has an elongated arm. The mount is attached to one end portion of the arm. The mount of a size and shape to fit into the hole of the support. The mount has a head, or stop means, limiting linear movement of the mount relative to the oarlock and providing structure to connect the mount to the arm. Attached to the arm is a member engageable with the support to limit the pivotal movement of the arm about the axis of the mount when the mount is in the hole of the support. The outer end of the arm has a means adapted to be connectd to an object, such as a floating fish basket, a fish stringer, bait container or the like.

The support can be a fishing boat with at least one oarlock having a generally upright hole. The mount can be a rod or bolt adapted to fit into the hole of the oarlock, whereby the arm projects generally laterally from the side of the boat. The member on the arm extends in the direction of, and generally parallel with, the mount so as to engage the outside of the boat and thereby limit the pivotal movement of the arm relative to the side of the boat.

The rod can be provided with a first downwardly open hook and a second upwardly open hook at the outer end thereof to accommodate a fishing rod. In addition, an upwardly directed spiral member can be secured to a portion of the rod for holding a container, as a can of worms or a can of liquid refreshment.

The mount can be articulately connected to the arm with a connector assembly so that the angle of the arm relative to the boat can be changed. The articulate connection permits the mount to be used with varius types of oarlocks and permits the adjustment of the stop means relative to the outside of the boat. The mount means can also be a non-circular or square member adapted to fit into a non-circular hole in the side of the boat. The mount can be attached to a C-clamp or similar support so that it can be located on he transom of a boat or on boats not equipped with oarlocks.

An object of the invention is to provide a holder which s releasably mounted on a support for holding an object spaced from the support. A further object of the invention is to provide a holder adapted to fit into the hole of an oarlock and cooperate with the side of a boat to limit angular movement of the holder relative to the boat. Another object of the invention is to provide a holder for a floating fish basket which maintins the fish basket a short distance from the side of the boat. Still another object of the invention is to provide a holder which is attachable to all types of fishing boats, adaptable to carry a fishing rod and is sturdy in construction.

In the drawings:

FIG. 6 is a side elevational view of a modified holder;

FIG. 7 is an enlarged sectional view taken along the line 7—7 of FIG. 6;

FIG. 8 is a side elevational view of a further modification of the holder;

FIG. 9 is an enlarged sectional view taken along the line 9—9 of FIG. 8;

FIG. 10 is a side elevational view of a further modification of the holder; and

FIG. 11 is a sectional view taken along the line 11—11 of FIG. 10.

Figure 1:
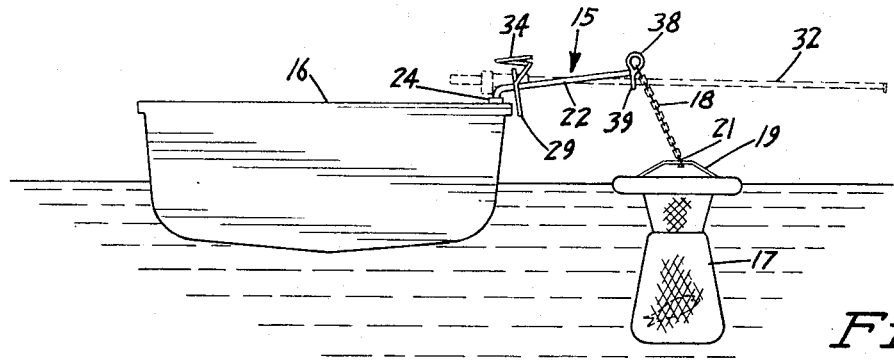
FIG. 1 is a diagrammatic view of a fishing boat equipped with the holder of the invention connected to a floating fish basket.

Referring to the drawings, there is shown in FIG. 1 the holder of the invention, indicated generally at 15, mounted on a fishing boat 16. The holder is used to attach a floating wire fish basket 17 to the boat so that it is in a convenient position for the fisherman. The floating wire fish basket 17 is shown and described in applicant's U.S. Pat. No. 3,478,463. A short chain 18, or similar flexible line, is used to connect a ring 38 on the outer end of the holder 15 to the handle 19 of the fish basket 17. The outer end of the chain 18 has a snap hook 21 which is used to disconnect the chain from the basket. The hook 21 can be connected directly to a floating fish stringer, as shown in U.S. Pat. No. 3,561,652, or a conventional chain or line fish stringer. The chain 18 also can be connected to a minnow basket or bait bucket designed to be carried in the water.

Holder 15 has an elongated arm 22, as a metal rod, tube or the like. The inner end of arm 22 has a sharp bend and is attached to a mount 23 having a stop head 24. The mount 23 is a bolt having a head secured by a weld to the inner turned end of the arm 22. The mount 23 is adapted to be positioned in the generally upright hole of the oarlock 26 attached to the inside of the boat wall 16. Oarlock 26 has a conventional plastic liner 27. The body of the bolt is of a size and shape to project through the hole in the plastic liner 27 so that a nut 28 can be threaded onto the lower end of the bolt. In this manner, the mount can be permanently affixed to the oarlock 26.

Projected downwardly, in the same general direction as the mount 23, is a member or loop 29 attached to arm 22. The loop 29 is located closely adjacent the outer edge of the rail of the boat 16, thereby limiting the pivotal movement of the arm 22 relative to the boat. This keeps the arm 22 in a generally lateral position with respect to the side of the boat. One end of the loop 29 projects upwardly and is turned downwardly in the shape of the ring or loop 30 which has a lower opening or mouth 31. This ring is used to accommodate a protion of the fishing rod 32. Another portion of the fishing rod is retained in an upwardly open transverse hook 39 secured to the outer end of the rod 22. Hook 39 is positioned in a plane normal to the longitudinal plane of ring 38.

The opposite end of the loop 29 has an outwardly directed generally horizontal lateral leg 33 which leads to an upwardly spiral portion 34 surrounding or defining a space for accommodating a container 37, as a can or box of worms, can or bottle of beverage or the like. The container 37 rests on the lower lateral leg 33 and is retained in the space by the spiral portion 34. The diameter of the spiral portion 34 can be selected to accommodate different size containers. Preferably, the diameter of the spiral portion 34 is of a size to accommodate the conventional size cylindrical boxes of worms or similar fishing bait.

The fishing rod 32 is held on the arm 22 by the use of a downwardly open ring 30 and an upwardly open hook 39 on the outer end of the rod 32. The mouth 31 is of a size to receive the smaller flexible portion of the rod 32. When the rod 32 is moved in a forward direction, the larger coupling portion of the rod 32 fits into the opening of the ring 30. This portion, being larger than the opening 31, prevents the rod 32 from falling out of the ring 30. In use, the fisherman merely pulls the rod 32 a short distance into the boat and moves the rod 32 in a downward direction until it is free from the ring 30.

The entire holder, except for the mount 23, is covered with a protective coating 41, such as plastic or rubber. The coating is resistant to salt water corrosion and functions as a rust preventive coating, as well as enhances the decorative appearance of the ohlder.

Figure 2:
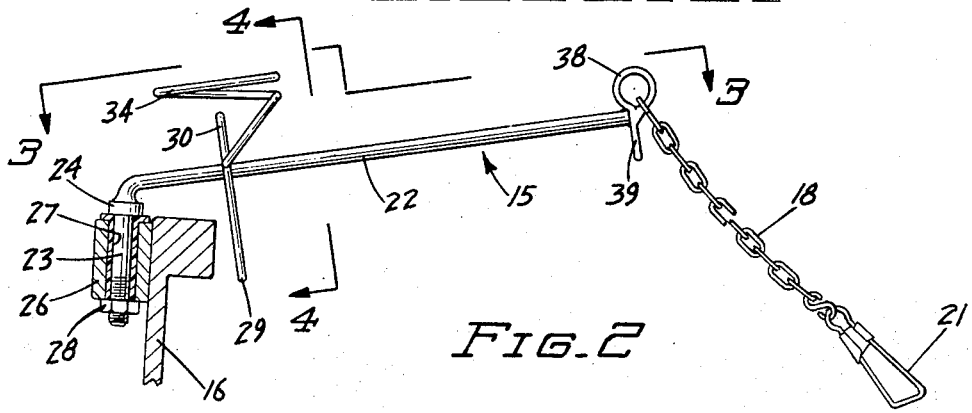
FIG. 2 is an enlarged side view of the holder of FIG. 1 in assembled relation with the oarlock of the boat.
Figure 4:
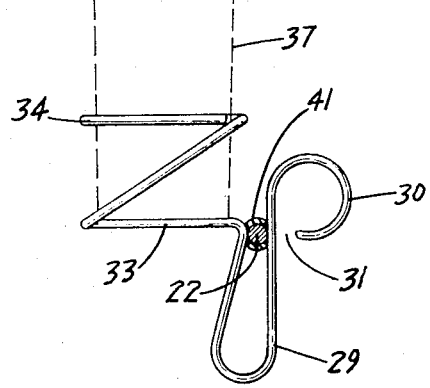
FIG. 4 is an enlarged sectional view taken along the line 4—4 of FIG. 2.
Figure 5:
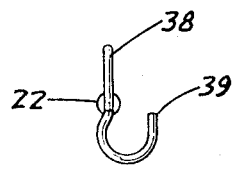
FIG. 5 is an enlarged outer end view taken along the line 5—5 of FIG. 3.

Referring to FIGS. 6 and 7, there is shown a modified holder, indicated generally at 42, usable with an oarloak of a fishing boat to attach objects to the boat. The holder 42 has an elongated arm 43, as a rod, tube or the like. Secured to the outer end of the arm 43 is a ring 44 and an upwardly open hook 46. An elongated flexible line or chain, similar to chain 18 shown in FIG. 2, is used to attach a floating object to ring 44. The inner end of rod 43 has a reversed turned portion 47 and an elongated linear slot 48. A member or loop 49 is secured to the rod 43 and end 47 adjacent the outer end of the slot 48. One end of the loop is joined to ring 51 having a lower opening (not shown). The opposite end of the loop 49 is joined to the spiral container support 52. The loop 49, ring 51 and container support 52 are of the same general configuration as the corresponding structure shown in FIG. 4.

A mount, indicated generally at 53, is pivotally mounted to the inner end of the rod 43 so that the rod can be angularly moved to up and down positions and the loop 49 can be moved toward and away from the outside edge of the boat. Mount 53 comprises a generally upwardly directed bolt 54 having a head 56. The rib 57 has a hole for accommodating a bolt 58. Bolt 58 has a square shoulder or neck 59 adapted to fit into the slot 48 and thereby prevent rotation of the bolt 58. A nut 61, threaded on the bolt 58, holds rib 57 in engagement with the side of the rod 43 and end 47. Rib 57 is a generally flat plate having a hole accommodating the bolt. Other types of projections as an elongated loop can be used in lieu of rib 57.

Referring to FIGS. 8 and 9, there is shown a further modification of the holder, indicated generally at 62, mountable on the oarlock of a boat. Holder 62 comprises an elongated rod 63 secured at the outer end thereof to a ring 64 and an upwardly open hook 66. An elongated flexible line or chain, similar to chain 18 shown in FIG. 2, is used to attach a floating object, as a floating fish basket, to ring 64. The inner end of rod 63 has an elongated flat portion 67. A longitudinal slot 68 is located in the flat portion 67. Secured to the rod 63 adjacent the outer end of the flat portion 67 is a downwardly directed member 69. A ring 71, having a bottom opening, is attached to the rod 63 adjacent the member 69. Laterally spaced from the ring 71 is a container support 72. The member 69, ring 71 and container support 72 are substantially identical to the corresponding structure shown in FIG. 4.

A mount 73, identical with the mount 53, is used to attach the rod to an oarlock of a boat. The parts of mount 73 which correspond to the parts of mount 53 are identified with the same reference numeral having the suffix A. A bolt 74 having a square neck 76 located in the slot 68, projects through a hole in rib 57A. A nut 77, threaded on bolt 74, holds the flat portion 67 in an assembled and fixed relationship with respect to rib 57A. This pivot and clamping structure permits the arm 63 to be adjusted at various angles and allows the stop member 69 to be moved into firm engagement with the side of the boat.

Figure 3:
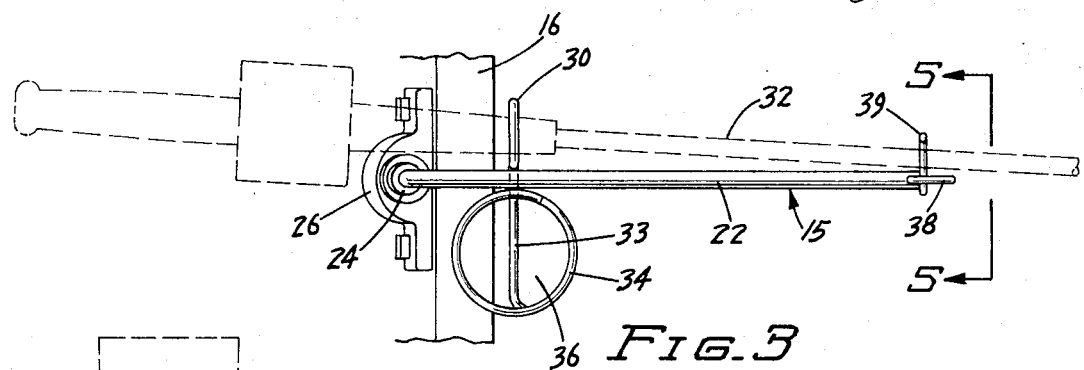
FIG. 3 is a top plan view of the holder taken along the line 3—3 of FIG. 2.

Referring to FIGS. 10 and 11, there is shown yet another modification of the holder of the invention, indicated generally at 78. The holder 78 has an elongated rod 79, as a metal rod or tube. A ring 81 and hook 82 are secured to the outer end of the rod. An elongated flexible line or chain, similar to chain 18 shown in FIG. 2, is used to attach a floating object to ring 81. Adjacent the inner end of the rod is a downwardly open ring 83 and a container support 85 similar to the hook 30 and container supports 33 and 34 shown in FIGS. 3 and 4 of the drawings. The inner end 86 of the rod 79 is a bent curved downwardly directed portion attached to a head 87. Secured to the bottom of the head 87 is a non-circular mount finger 88. The mount finger 88, shown as an elongated square member, is associated with a pair of plates 89 and 91 having aligned square holes 92. The plates 89 and 91 are located on opposite sides of a spacer block 93 and are attached to a portion of a side wall 94 of a boat with fasteners 96. The non-circular shape of the mount finger 88 prevents the arm 74 from rotating relative to the boat. The plates 89 and 91 can be mounted on any portion of the boat in a manner so that the top hole 92 is located in a position which permits the arm 79 to project laterally from the boat. A removable member 96, as a pin, cotter pin, snap or the like, is mounted on finger 88 to prevent accidental detachment of the holder from the boat.

While there have been shown and described preferred embodiments of the invention, it is understood that various changes in the shape and length of the holder can be made by those skilled in the art without departing from the invention. The holder can be made of metal, plastic, or similar materials. Metal holders can be coated with paint, plastic or rubber materials. The lock nut can be replaced with cotter pins, snap pins and similar retaining devices.

The embodiments of the invention in which an exclusive property or privilege is claimed are defined as follows:

1. A holder for attaching an object to a boat having at least one oarlock with a generally upright hole comprising: an elongated arm having an end portion with an elongated slot, a mount at said end portion of the arm positionable at an angle with the arm, said mount having a cylindrical member adapted to fit into the hole of the oarlock and a head larger than the hole of the oarlock on one end of the cylndrical member providing a stop to locate the cylindrical member in the hole in the oarlock, and projection means secured to and extended from the head, and connector means having a portion located in the slot coupling the arm to the projection means, said connector means having cooperating members adjustable relative to each other to hold the arm at a selected angle relative to the mount and at a selected longitudinal position on said mount, said cooperating member being releasable whereby the arm can be angularly and linearly movable relative to the projection means, and a stop member secured to the arm and projected generally in the direction of the mount, said stop member being adjustable with the arm relative to the mount whereby the stop member can be located in engagement with an outside portion of a boat adjacent the oarlock to limit pivotal movement of the arm relative to the boat.

2. The holder of claim 1 including: an upwardly directed spiral curved member attached to the arm for holding a container.

3. The holder of claim 1 wherein: the arm is an elongated rod, said end portion being a generally U-shaped section of the rod forming said elongated slot.

4. The holder of claim 1 wherein: said projection means has an opening, said connector means has a first member having a portion extended through the opening in the projection means.

5. The holder of claim 1 wherein: the end portion of the arm having the elongated slot is an elongated flat portion.

6. The holder of claim 1 wherein: said projection means is an elongated member secured to the head and projecting longitudinally therefrom, said connector means including a first member accommodating the elongated member and fastening means holding the elongated member on the first member of the connector means.

7. The holder of claim 1 wherein: the projection means has an opening accommodating a portion of the connector.

8. The holder of claim 1 wherein: the end portion of the arm having the slot is an elongated loop member and the projection means has an opening, said connector means extended through the slot and opening relative to the mount.

9. A holder for attaching an object to a support comprising: an elongated arm having an end portion with an elongated slot, a mount at said end portion of the arm positionable at an angle with the arm, said mount having a body, a head on the body and projection means secured to the head and extended from the head, connector means coupling the arm to the projection means, said connector means having a portion extended through the slot and cooperating members adjustable relative to each other to hold the arm at a selected angle relative to the mount and at a selected longitudinal position on said mount, and a stop member secured to the arm and projected generally in the direction of the mount, said stop member being adjustable with the arm relative to the mount.

10. The holder of claim 9 wherein: the projection means has an opening accommodating a portion of the connector.

11. The holder of claim 9 including: an upwardly directed spiral curved member attached to the arm for holding a container.

12. The holder of claim 9 wherein: the arm is an elongated rod, said end portion being a generally U-shaped section of the rod forming said elongated slot.

13. The holder of claim 9 wherein: said projection means has an opening, said connector means has a first member having a portion extended through the opening in the projection means.

14. The holder of claim 9 wherein: the end portion of the arm having the elongated slot is an elongated flat portion.

15. The holder of claim 9 wherein: said projection means is an elongated member secured to the head and projecting longitudinally therefrom, said connector means including a first member accommodating the elongated member and fastening means holding the elongated member on the first member of the connector means.

16. The holder of claim 9 wherein: the end portion of the arm having the elongated slot is an elongated loop member and the projection means has an opening, said connector means extended through the slot and opening whereby the arm is longitudinally movable relative to the mount.

* * * * *